March 25, 1952 D. S. EVANS 2,590,599

CALCULATING MACHINE

Filed Jan. 6, 1950 4 Sheets-Sheet 1

INVENTOR
DAVID SILVESTER EVANS
BY Bailey, Stephens & Huettig
ATTORNEYS

March 25, 1952 D. S. EVANS 2,590,599

CALCULATING MACHINE

Filed Jan. 6, 1950 4 Sheets-Sheet 2

INVENTOR

DAVID SILVESTER EVANS

BY Bailey, Stephens & Huettig

ATTORNEYS

March 25, 1952 D. S. EVANS 2,590,599

CALCULATING MACHINE

Filed Jan. 6, 1950 4 Sheets-Sheet 3

INVENTOR
DAVID SILVESTER EVANS
BY Bailey, Stephens & Huettig
ATTORNEYS

CALCULATING MACHINE

Filed Jan. 6, 1950 4 Sheets-Sheet 4

INVENTOR
DAVID SILVESTER EVANS
By Bailey, Stephens & Huettig
ATTORNEYS

Patented Mar. 25, 1952 2,590,599

UNITED STATES PATENT OFFICE 2,590,599

CALCULATING MACHINE

David Silvester Evans, Radlett, England

Application January 6, 1950, Serial No. 137,099
In Great Britain January 7, 1949

12 Claims. (Cl. 235—61)

This invention relates to calculating machines of the digital kind in which information to be operated on by the machine is supplied in the form of discrete events, for example electrical pulses or mechanical displacements, and the said events are added or subtracted in the required manner, the result being presented in digital form.

In certain applications, it is desirable that the arithmetic processes which are normally carried out by such calculating machines in the scale of ten be performed in the scale of two or binary scale.

In this specification, the term "word" is used to represent any combination of digits on the binary scale representing information, such as a corresponding number on the decimal scale.

According to the present invention, a calculating machine of the digital kind comprises an input register assembly having a plurality of two-position setting devices the positions of each of which represent the respective digits of the binary scale, an accumulator comprising a plurality of two-position indicators the positions of each of which represent the respective digits of the binary scale, operating means for transferring a word represented by the positions of the setting devices on the input register to the accumulator at a desired position, and a third register for recording the number of times and the position or positions in which the word is transferred to the accumulator.

Preferably, the third register (hereinafter termed for convenience the multiplier register) also comprises a plurality of two-position indicators the positions of each of which represent the respective digits of the binary scale.

Advantageously, means is associated with the accumulator and multiplier registers for determining an addition or subtraction operation in the respective register (hereinafter termed +/− selectors). Further means may with advantage be provided for erasing a complete word in each register in one operation. Such means will hereinafter be referred to for convenience as "clearing means."

A calculating machine according to the present invention may perform its calculating operations electrically, electromechanically or entirely mechanically, as preferred, and one example of each form will now be described by way of illustration only, with reference to the accompanying drawings in which.

Figure 1:
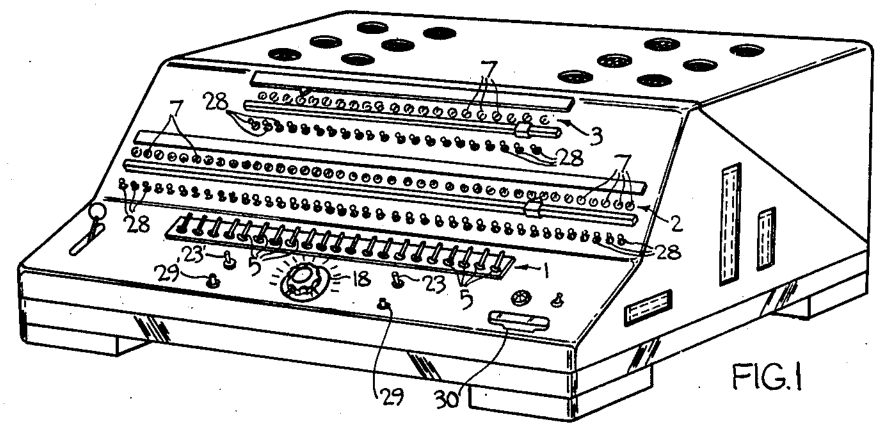
Fig. 1 is a general perspective view of an electrically operated machine.
Figure 3:
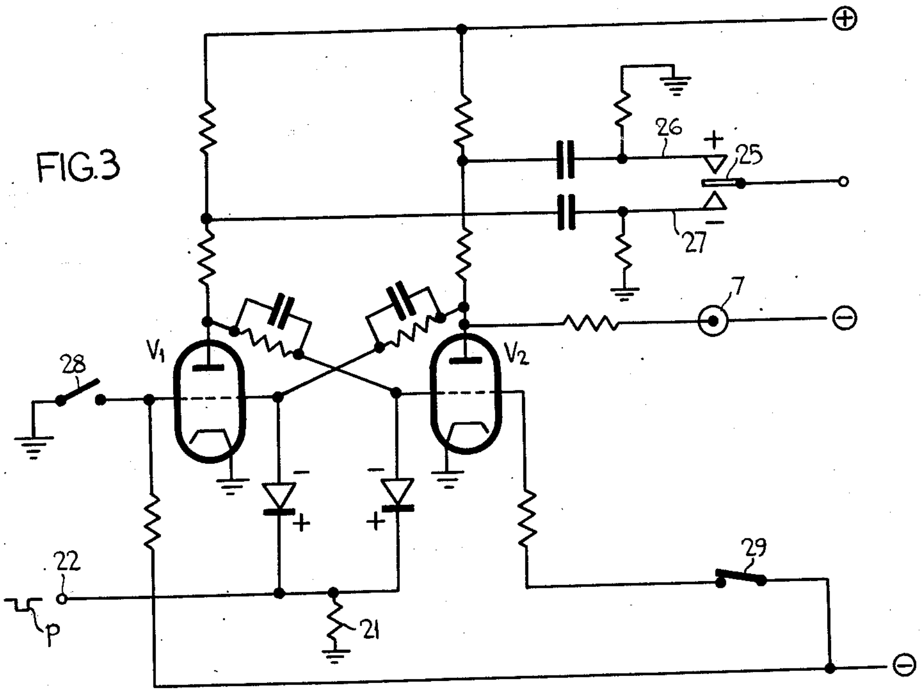
Fig. 3 is a circuit diagram of an add/subtract unit.
Figure 2:
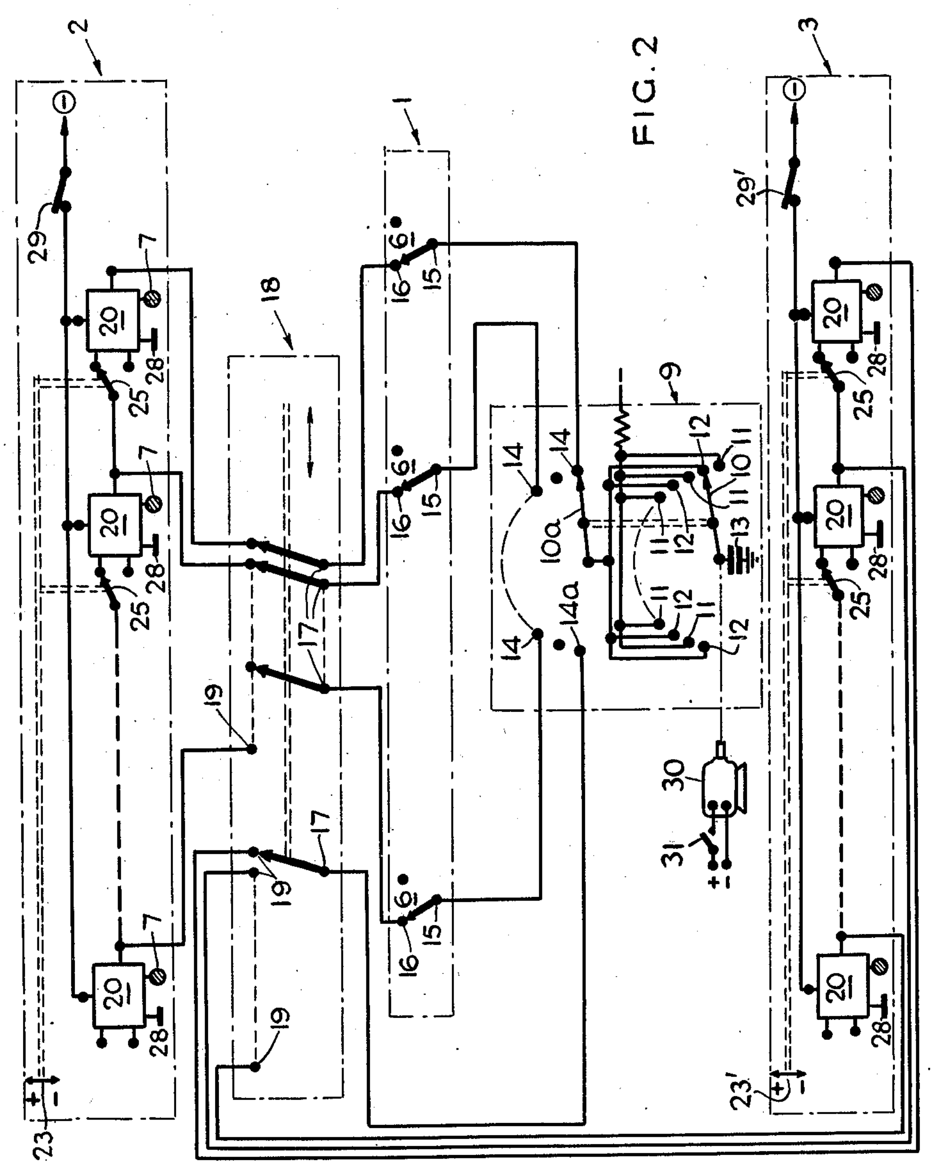
Fig. 2 is a skeleton circuit diagram of the the machine illustrated in Fig. 1, some of the parts being omitted where they are of a repetitive nature and are identical with others already shown.

In the first form of calculating machine, illustrated in Figs. 1 to 4, the input register 1, accumulator register 2 and multiplier register 3 are mounted on the front panel 4 of the machine.

The input register 1 comprises a plurality of two-position setting devices 5, constituted by the dollies of on-off switches 6 (Fig. 2) each representing, in the "off" position, the digit 0 and in the "on" position the digit 1.

The accumulator register 2 comprises a number of lamps 7 each representing, when illuminated, the digit 1 and when extinguished, the digit 0. Above the accumulator register 2 is located the multiplier register 3, similarly constituted by lamps 7 which also represent the digits 1 and 0.

Within the machine is an operating member constituted by a pulse generator in the form of a two-bank single-pole multi-position switch 9, the wiper arm 10 of the first bank of which moves over a number of contacts 11, 12 arranged alternately. The said wiper arm 10 is connected to a reservoir condenser 13. All the contacts 11 of the switch 9 are connected to the negative terminal of a battery (not shown) and the condenser 13 is thus charged when the wiper arm engages each of these contacts.

All the contacts 12 of the pulse generator switch 9 are connected to the second or distributor bank of the switch, all the odd-numbered contacts 14 except the last, 14*a*, being connected to the one pole 15 of the respective setting switches 6 of the input register 1. The wipers 10, 10*a* are ganged for simultaneous movement and the positions of the distributor contacts 14 correspond to the positions of the contacts 11 in the first bank. The intermediate contacts of the distributor bank are on open circuit. The last contact 14*a* and the other poles 16 of the setting switches 6 are connected to the one contact 17 of a multi-way shift switch 18

(termed the multiplier switch). The other poles 19 of the said multiplier switch 18 are connected to respective add/subtract elements 20 controlling corresponding lamps 7 in the accumulator and multiplier registers 2, 3 as the case may be, and are arranged in such fashion that the setting switches 6 of the input register are always connected to add/subtract elements 20 of some portion of the accumulator 2, whilst the last contact 14*a* of the distributor bank of the switch 9 is always connected to one of a number of add/subtract elements 20 each controlling a corresponding lamp 7 in the multiplier register 3.

If a setting switch 6 on the input register 1 is closed when the wiper 10*a* sweeps the corresponding contact 14 of the distributor bank of the switch 9, the reservoir condenser 13 is discharged through a low resistance 21 in the input circuit 22 of the corresponding add/subtract element 20, thus producing a negative pulse at the said input. If the setting switch 6 is open, the condenser 13 retains its charge.

On a single operation of the switch 9, the word standing in the input register 1 is added binarily to or subtracted binarily from that standing in the accumulator 2 according to the state of an accumulator +/— selector switch 23 as pre-set by the operator in a manner described below. Negative numbers are indicated by complements, i. e. subtraction of 1 in the lowest place from the cleared accumulator causes 1 to appear at every indicator in the accumulator. By shifting the multiplier switch 18 between the input and accumulator registers 1, 2 through $n$ digits higher or lower and operating the switch 9 once, the word standing in the input register 1 multiplied or divided by $2^n$ respectively, is added to (or subtracted from) the number standing in the accumulator 2.

By successive suitable shifts of the multiplier switch 18 and the operations of the pulse generating switch 9, the binary number standing in the input register 1, multiplied by any desired other binary number, can readily be added to (or subtracted from) the number standing in the accumulator 2, within the capacity of the accumulator.

The accumulator +/— switch 23 operates simultaneously a series of relays 24 (Fig. 4) which control change-over contacts 25 in the output of each add/subtract element 20. A similar switch 23′ is associated with the multiplier register 3 for performing the same function.

The multiplier register 3 comprises a desired number of indicating lamps 7 which record the sequence of shifts of the multiplier switch 18 and associated operations of the pulse generating switch 9, together with the multiplier register +/— selector 23′ and means for clearing the register. With the multiplier register selector 23′ at +, the multiplier switch 18 in its lowest digit position, and the multiplier register "cleared," i. e. all digits 0, one operation of the switch 9 causes 1 to appear in the lowest digit position of the multiplier register 3, i. e. the lamp 7 in this position lights up. A further operation in this position of the switch 18 causes 0 to appear (lamp 7 extinguished) in the lowest position of the multiplier register and 1 to appear in the next higher position of this register. Similarly, operation of the switch 9 with the multiplier switch 18 shifted up $m$ digit places causes a 1 to appear $m$ places up in the multiplier register 3, and so on.

Alternately, with the multiplier register +/— selector 23′ at —, operation of the pulse generating switch 9 subtracts from the multiplier register 3. For example, in multiplying a number on the input register by ($2^p$—1) ($p$ integral), the multiplier switch 18 would be set to the $p^{th}$ position and the pulse generating switch 9 operated with both the accumulator and the multiplier selectors 23, 23′ at +. The switch 18 would now be set to the lowest place and the switch 9 operated with both selectors 23, 23′ at —. The product of the input word and the multiplier ($2^p$—) would thus be added to the accumulator 2 and the multiplier would be added to the multiplier register 3. More complicated multipliers are dealt with in a simpler way.

To carry out a division, the number to be divided is first set on the accumulator 2, and the divisor is then set on the input register 1. Normally, for division, the accumulator +/— selector 23 is at — and the multiplier register +/— selector 23′ is at +, with the multiplier register 3 cleared. Operation of the pulse generator switch 9 with the multiplier switch 18 set to the $d^{th}$ place subtracts from the dividend $2^d$ times the divisor, and records $2^d$ in the multiplier register 3. $d$ is chosen by the operator so that the resulting "word" in the accumulator 2 (whether positive or negative) is as small as possible. The process is repeated until the "word" in the accumulator 2 is zero. If, at any stage, the "word" becomes negative (indicated by a complement) it can be added to by setting the accumulator +/— selector 23 to + and the multiplier register +/— selector 23′ to —. When the accumulator 2 is zero, the word in the multiplier register 3 is the required quotient.

The add/subtract element 20 may be of any desired form, according to requirements. In the preferred arrangement shown in Fig. 3, however, each element consists essentially of a pair of triodes $V_1$ $V_2$ connected as a symmetrical D. C. "flip-flop" circuit, the two stable states of which represent, respectively, the digits 0 and 1. Each element has an input terminal 22 and two output channels 26, 27 which are connected to the fixed contacts of the switch 25. The channel 26, is a "carry" and the other 27, a "borrow" channel. These are selectively connected by the switch 25 to the input terminal 22 of the next higher element by the +/— selector 23 or 23′ for the register.

Each add/subtract element 20 controls a respective lamp 7, and each lamp in the accumulator register 2 and the multiplier register 3 has a manual setting button 28 associated therewith, operation of which lights the lamp by setting the element to the 1 digit state. The contacts of this button 28 are normally open and when closed remove the negative bias normally applied to the grid of $V_1$. A single "clearing" switch 29 resets all the elements 20 in the accumulator register 2 to the 0 digit state, extinguishing all the lamps 7. A similar switch 29′ is provided for the multiplier register 3.

Receipt by any add/subtract element 20 of a negative pulse P (as shown) at the input terminal 22 causes a change of state of the element. A change from the 0 to the 1 state causes a negative pulse to be transmitted to the "borrow" output channel 27 and a positive pulse to the "carry" output channel 26. A change from the 1 to the 0 state causes a negative pulse to be transmitted to the "carry" output channel 26 and a positive pulse to the "borrow" output channel 27. Receipt of a positive pulse at the input 22 causes no change in the element 20.

With the +/− selector 23 of the accumulator register 2 in the "plus" position the input terminals 22 of all but the first add/subtract element 20 are connected to the "carry" channels 26 of the respective preceding element 20. Operation of the pulse generator switch 29 through one revolution—preferably by means of a motor 30 (Fig. 2) controlled by a push button switch 31—feeds a negative pulse to each element 20 in turn and causes a binary addition to take place in the element, i. e. if 1 has been added to 1 the associated indicator lamp 7 is extinguished and a pulse indicating "carry" appears at the terminal 22 of the following element 20, whilst for the addition of 1 to 0 the said indicator lamp 7 is lit and no negative pulse is transmitted. If 0 is added to 1, no change takes place in the add/subtract element 20.

At the input terminal 22 of the succeeding add/subtract element 20, a negative pulse may also be received at a slightly later instant of time from the pulse generator switch 9. The new pulse arriving at the said input terminal 22 is added in the same way to change the state of the element 20.

On completion of one revolution of the pulse generator switch 9, the number set on the input register 1 has been added to the number previously indicated on the accumulator register 2, and 1 is added to the number previously indicated on the multiplier register 3. In a similar way subtraction takes place when the accumulator +/— selector 23 is at —.

Figures 4, 5:
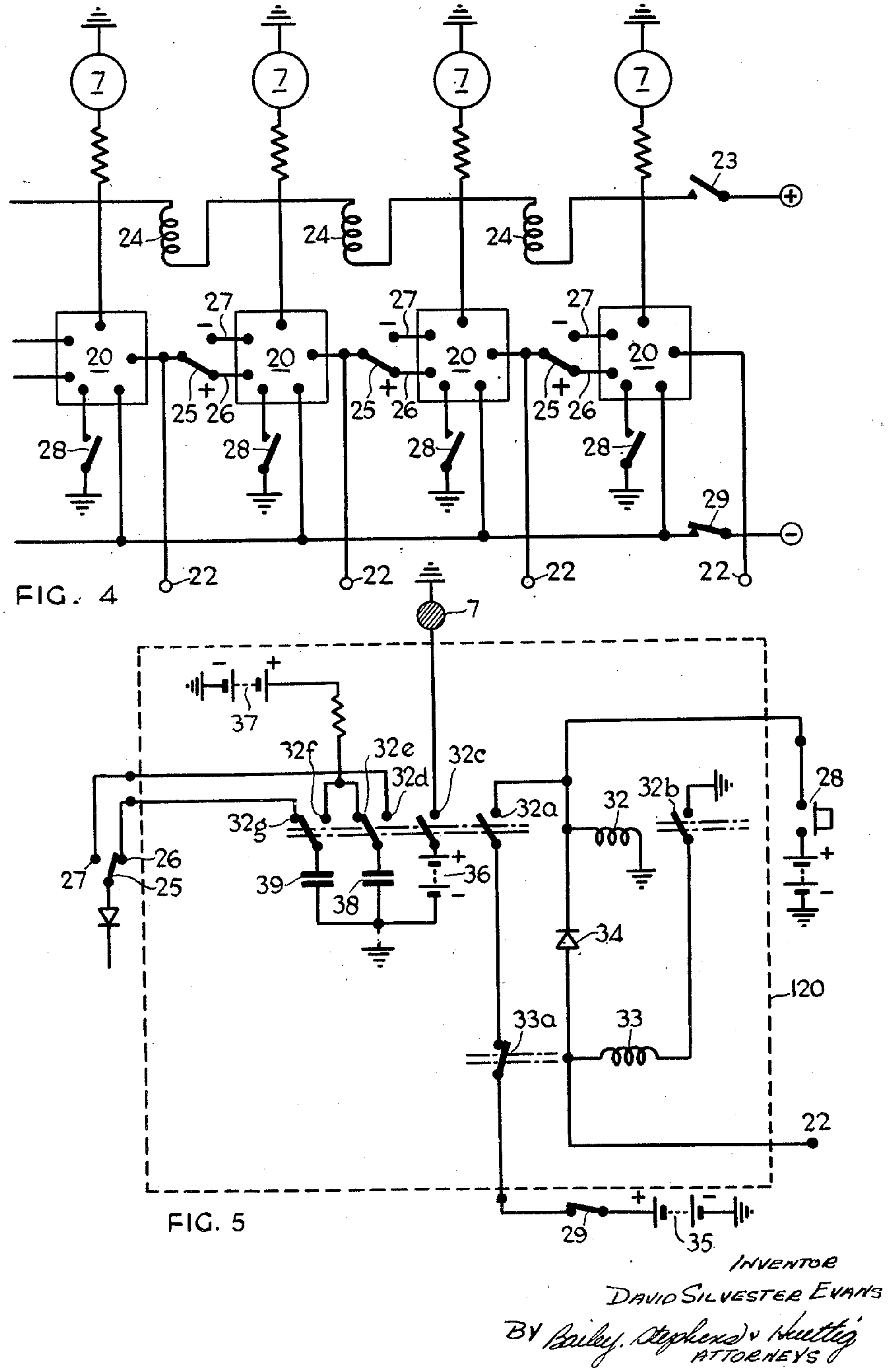
Fig. 4 is a fragmentary and partly schematic circuit diagram illustrating the switching operations involved in the machine of Fig. 1.
Fig. 5 is a circuit diagram of an alternative form of add/subtract unit.

In an electro-mechanically operated machine, the input register 1, pulse generator switch 9, and the +/— selector switches 23, 23′ are arranged as described above. The essential differences are in the construction of the add/subtract elements, and the initial setting and clearing circuits. These are shown in Fig. 5, to which reference will now be made.

Each add/subtract element 120 comprises first and second relays 32, 33 respectively, the de-energised condition of both of which represents the 0 digit state of the element. Both relays have the one ends of their windings connected through a rectifier 34 arranged to oppose the flow of current from the first relay 32 to the second relay 33. The said one end of the second relay winding is directly connected to the input terminal 22 of the element 120, whilst the said one end of the first relay winding is directly connected to an initial "1—setting" switch 28. Energisation of the first relay 32 to give the 1 digit state of the element 120 is maintained by its own hold-on contacts 32*a*, by the normally closed contacts 33*a* of the second relay 33, and by a normally closed "clear" switch 29 common to all elements 120 and which is connected to a battery 35. The circuit to earth of the second relay winding 33 is completed by a pair of contacts 32*b* closed on energisation of the first relay 32.

Receipt of a positive pulse at the input terminal 22 of the add/subtract element 120 causes a change of state of the element. When such a pulse is received in the de-energised condition of both relays 32, 33 the first relay 32 alone becomes energised and the hold-on contacts 32*a* are immediately closed. At the same time contacts 32*b* . . . 32*g* are closed. When contacts 32*c* are closed the indicator lamp 7 is lit from the supply 36. The contacts 32*b* in circuit with the second relay winding 33 do not make until the positive input pulse has disappeared; therefore, the second relay 33 remains de-energised. The change is thus from the 0 to the 1 state.

The contacts 32*d*, 32*e* and 32*f*, 32*g* represent change over contacts. In the de-energised state of the relay 32, the contacts 32*e*, 32*g* are made, and a battery 37 is connected by the former to a condenser 38 whilst a second condenser 39 is connected to the "carry" output channel 26. In the energised state of the relay, the contacts 32*d* connect the charged condenser 38 to the "borrow" output channel 27, whilst the contacts 32*f* connect the discharged condenser 39 to the battery 37 for re-charging.

A change of state of an add/subtract element 120 from 0 (as shown) to 1 thus causes a positive pulse to appear at the "borrow" output channel 27 of the element 120. The arrival of a further pulse at the input terminal 22 energises the second relay 33 which thereupon opens its contacts 33*a* in the hold-on circuit of the first relay 32. The first relay 32 is thus de-energised, and opens the contacts 32*b* in the earth connection of the second relay 33, thus de-energising this relay as well. This represents a change of state of the add/subtract element 120 from 1 to 0, and causes a positive pulse to be transmitted to the "carry" output channel 26 from the charged condenser 39 through the contacts 32*g*, the lamp 7 being extinguished by the opening of the contacts 32*c*.

Figures 6, 7:
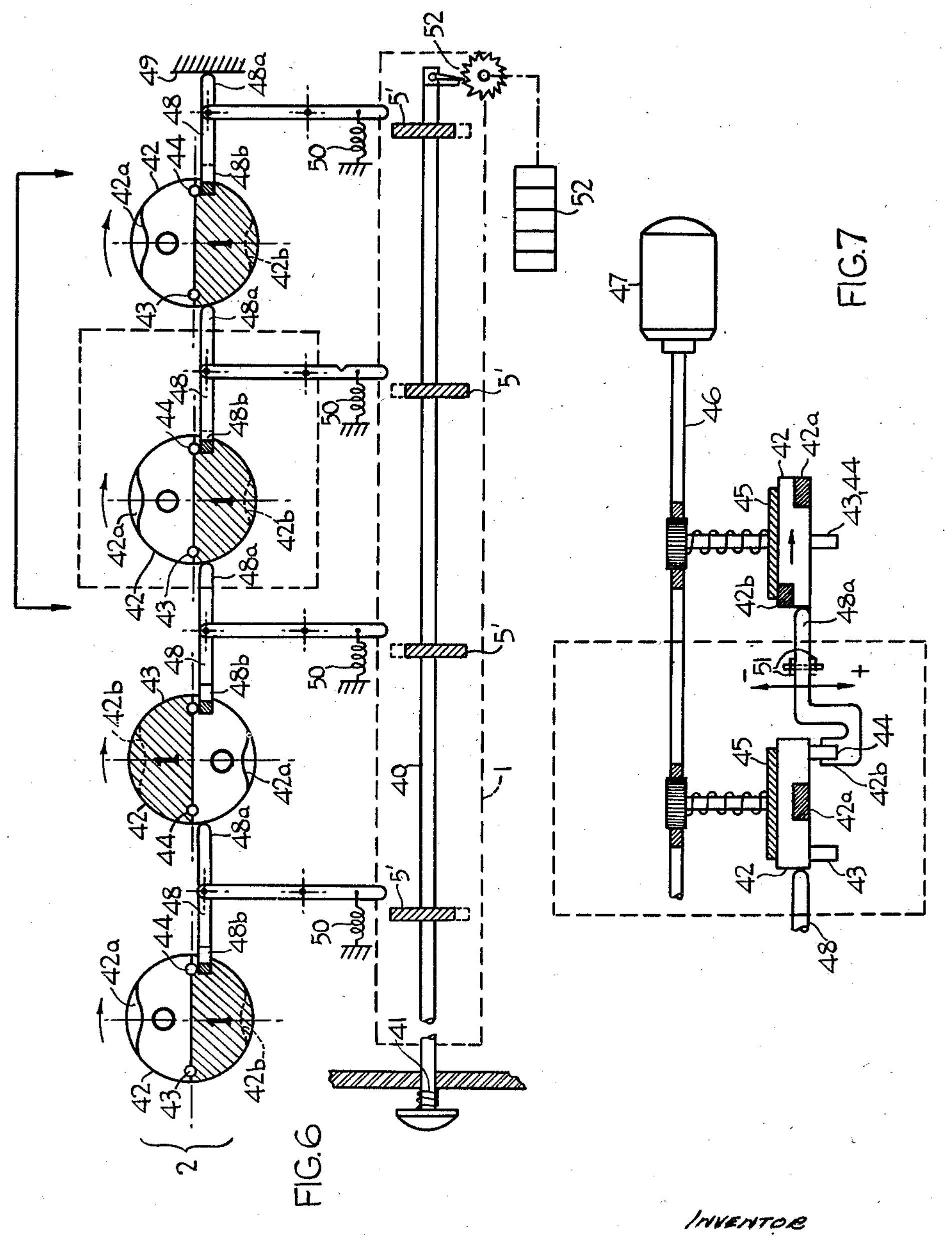
Figs. 6 and 7 illustrate schematically an arrangement of mechanically operated machine according to the present invention.

In a mechanical form of calculating machine according to the present invention and illustrated in Figs. 6 and 7, the setting devices of the input register 1 each comprise a two-position trigger 5′, all the triggers 5′ being carried on a common operating rod 40 which is displaceable endwise against a return spring 41 to carry all the triggers 5′ with it. The one or inoperative position of a trigger 5′ represents the digit 0 and the other or operative position the digit 1.

The accumulator register 2 consists of a plurality of discs 42 having two positions of rest, each defined by a stop 43, 44 respectively spaced 180° apart. As seen in Fig. 7, each disc 42 is coupled through a slipping clutch 45 to a common shaft 46 which is continuously rotated by an electric motor 47. The discs 42 are interconnected by detent levers 48, each of which bears at one end 48*a* on the circumference of the disc 42 in the next lower place and at the other end 48*b* normally lies in the path of a stop pin 43 or 44 on the next higher disc 42. The lever 48 in the lowest place bears at its end 48*a* against a fixed stop 49 on the frame of the machine. Each detent lever 48 is displaceable lengthwise in its own plane to effect a "carry" or "borrow" operation, and is also displaceable transversely (as seen in Fig. 6) between + and — positions. The lever 48 in Fig. 7 is in the + position.

Each disc 42 is relatively thick, and has two diametrically opposite indentations 42*a*, 42*b* in its circumference, the one formed in one end face of the disc and the other in the other end face. The depth of each indentation 42*a*, 42*b* is sufficient to allow the associated detent lever 48 to be displaced lengthwise by a spring 50 for a distance sufficient to release the stop pin 43 or 44 on the next higher disc 42, thus allowing this disc 42 to rotate. Meanwhile, rotation of the lower disc 42 returns the detent lever 48 into the path of the other stop pin 44 or 43 on the higher disc 42, so permitting only 180° of rotation to the higher disc for each "carry" or "borrow" operation.

Each detent lever 48 is displaceable longitudinally in the opposite direction under the control of pivoted latch arms 51 whose one ends 51a lie in the path of a setting trigger 5′ on the input register 1 when the trigger is set to the 1 position. Thus, if the operating rod 40 is moved against its spring 50 and allowed to return, each trigger 5′ which is set to 1 deflects a respective latch arm 51 to release a corresponding disc 42 in the accumulator register 2. In order to ensure that, if a disc 42 is to perform a carry operation as a result of an input from the register 1, this operation does not coincide with an input to the next disc 42, provision is made for a finite delay between the effective operation of each successive trigger 5′, this delay being greater than the time of one half cycle of rotation of a disc 42. If all the discs originally showed 0, the number set up in the input register 1 now appears in the accumulator 2. By arranging that the multiplier register is constituted by a mechanical trip counter indicated at 52 and operated by the rod 40, the same calculations can be performed by corresponding operations on the mechanical machine as can be performed on the electronic or electromechanical constructions previously described.

It will be understood that there are many possible variants of detail construction in all the above described forms of calculating machine.

What I claim is:

1. A binary calculating machine capable of operation to perform addition, subtraction, multiplication and division, comprising a binary accumulator having a plurality of elements each occupying a position identifiable with one of the digit places of a binary number to be entered in the accumulator and each operable to assume either one of two states respectively identifiable with binary 0 and binary 1, column-transfer means associated with each element identifiable with a lower digit place and rendered operative by each alternate change in state of the associated element directly to change the state of the element identifiable with the next higher digit place, conditioning means operable to either one of two positions in one of which the transfer means are rendered operative by those changes of state of the accumulator elements which each correspond to a change from binary 1 to binary 0, these elements then being conditioned for addition, and in the other of which positions the transfer means are rendered operative by those intervening changes of state which each correspond to a change from binary 0 to binary 1, the accumulator elements then being conditioned for subtraction, a binary register having a plurality of devices each identifiable with one of the digit places of a binary number to be entered in the register and each operable to either one of two settings respectively identifiable with binary 0 and binary 1, a plurality of means each associated with a digit place of the register and operable if the respective device is in its binary 1 setting to transmit a state-changing impulse from the associated digit place to that accumulator element which is in the same relative digit place in a group of such elements, operating means which when actuated will sequentially operate all the impulse-transmitting means, for which the associated register devices are in the binary 1 setting, in a predetermined order of significance of digit place and at intervals of time at least long enough to permit a change of state of an accumulator element to be effected in the interval between any two successive impulses, a register comprising digital counting means, and means adapted to change the indication of the counting means by one digit in the least significant digit place for each transmission of a sequence of state-changing impulses to the group of accumulator elements identifiable with the least significant digit places of the binary number to be entered in the accumulator.

2. A binary calculating machine as claimed in claim 1, in which the impulse-transmitting means includes shift means operable to select as the group of accumulator elements to be supplied with the sequence of impulses any one of a series of such groups respectively identifiable with groups of digit places in the number to be entered in the accumulator that are displaced by one digit place from each other, and in which the means for changing the indication of the digital counting means includes similar shift means operable to select the digit place in the counting means at which the change of indication by one digit is to be effected, the two shift means being actuated in synchronism with each other so that the digit change will be effected in that digit place which is displaced from the least significant place in the counting means by the same number of digit places as that by which the group of digit places identifiable with the selected group of accumulator elements is displaced from the group of least significant digit places of the binary number to be entered in the accumulator.

3. A binary calculating machine capable of operation to perform addition, subtraction, multiplication and division, comprising a binary accumulator having a plurality of elements each occupying a position identifiable with one of the digit places of a binary number to be entered in the accumulator and each operable to assume either one of two states respectively identifiable with binary 0 and binary 1, column-transfer means associated with each element identifiable with a lower digit place and rendered operative by each alternate change in state of the associated element directly to change the state of the element identifiable with the next higher digit place, conditioning means operable to either one of two positions in one of which the transfer means are rendered operative by those changes of state of the accumulator elements which each correspond to a change from binary 1 to binary 0, these elements then being conditioned for addition, and in the other of which positions the transfer means are rendered operative by those intervening changes of state which each correspond to a change from binary 0 to binary 1, the accumulator elements then being conditioned for subtraction, a binary register having a plurality of devices each identifiable with one of the digit places of a binary number to be entered in the register and each operable to either one of the settings respectively identifiable with binary 0 and binary 1, a plurality of means each associated with a digit place of the register and operable if the respective device is in its binary 1 setting to transmit a state-changing impulse from the associated digit place to that accumulator element which is in the same relative digit place in a group of such elements, operating means which when actuated will sequentially operate all the impulse-transmitting means, for which the associated register devices are in the binary 1 setting, in a predetermined order of significance of digit place and at intervals of time at least long enough to permit a change of state of an accumulator element to be effected in the interval between any two successive impulses, a register comprising a plurality of elements each occupying a position identifiable with one of the digit places of a binary number to be entered in the register and each operable to assume either one of two states respectively identifiable with binary 0 and binary 1, column-transfer means associated with each register element identifiable with a lower digit place and rendered operative by each alternate change in state of the associated element directly to change the state of the register element identifiable with the next higher digit place, conditioning means operable to either one of two positions in one of which the transfer means are rendered operative by those changes of state of the register elements which each correspond to a change from binary 1 to binary 0, the register elements then being conditioned for addition, and in the other of which positions the transfer means are rendered operative by those intervening changes of state which each correspond to a change from binary 0 to binary 1, the register elements then being conditioned for subtraction, and means for transmitting a state-changing impulse to the register element identifiable with the least significant digit place of the number to be entered in the register for each transmission of a sequence of state-changing impulses to the group of accumulator elements identifiable with the least significant digit places of the number to be entered in the accumulator.

4. A binary calculating machine as claimed in claim 3, in which the means for transmitting impulses to the accumulator elements includes shift means operable to select as the group of accumulator elements to be supplied with the sequence of impulses any one of a series of such groups respectively identifiable with groups of digit places in the number to be entered in the accumulator that are displaced by one digit place from each other, and in which the means for transmitting an impulse to a register element includes similar shift means operable to select any one of the register elements, the two shift means being actuated in synchronism with each other so that the digit place identifiable with the register element supplied with the respective impulse will be displaced from the least significant digit place in the number to be entered in the register by the same number of digit places as that by which the group of digit places identifiable with the selected group of accumulator elements is displaced from the group of least signifiant digit places of the binary number to be entered in the accumulator.

5. A binary calculating machine according to claim 1, wherein the register devices consist of electric switches each of which when in the setting identifiable with binary 1 renders operable the associated impulse-transmitting means, and wherein the operating means, when actuated, delivers an electric impulse to each such switch in turn.

6. A binary calculating machine according to claim 1, wherein each accumulator element consists of a D. C. flip-flop circuit controlling an associated indicator.

7. A binary calculating machine according to claim 6, wherein the conditioning means comprises a set of switches ganged for simultaneous operation and each associated with a flip-flop circuit so that in its one position it will connect the one anode of the associated such circuit to the input of the circuit in the next higher digit position and in its other position it will connect the other anode of the associated such circuit to the said input.

8. A binary calculating machine according to claim 3, wherein the register devices consist of electric switches each of which when in the setting identifiable with binary 1 renders operable the associated impulse-transmitting means, and wherein the operating means, when actuated, delivers an electric impulse to each such switch in turn.

9. A binary calculating machine according to claim 8, wherein each accumulator element and each register element consists of a D. C. flip-flop circuit controlling an associated indicator.

10. A binary calculating machine according to claim 9, wherein each conditioning means comprises a set of switches ganged for simultaneous operation and each associated with a flip-flop circuit so that in its one position it will connect the one anode of the associated such circuit to the input of the circuit in the next higher digit position and in its other position it will connect the other anode of the associated such circuit to the said input.

11. A binary calculating machine according to claim 2, wherein the shift means included in the impulse-transmitting means comprises a plurality of multi-position single-pole electric switches, each switch having a movable element that is connected to the appropriate register device and a plurality of contacts co-operating with the said movable element and each connected to one of the accumulator elements.

12. A binary calculating machine according to claim 11, wherein the shift means included in the indication-changing means comprises a multi-position single-pole electric switch having a movable element connected to the operating means by an impulse-transmitting member, so that it will receive an impulse for each actuation of the said operating means, and a plurality of contacts co-operating with the said movable member and each connected to one of the digit places of the digital counting means of the register in such a manner that an impulse delivered by way of a selected contact will cause the indication of the counting means to change by one digit in the respective digit place.

DAVID SILVESTER EVANS.

REFERENCES CITED

The following references are of record in the file of this patent:

UNITED STATES PATENTS

| Number | Name | Date |
|---|---|---|
| 2,375,332 | Torkelson | May 8, 1945 |
| 2,386,481 | Lang | Oct. 9, 1945 |
| 2,404,047 | Flory et al. | July 16, 1946 |
| 2,409,689 | Morton et al. | Oct. 22, 1946 |
| 2,445,215 | Flory | July 13, 1948 |